(12) United States Patent
Takemoto et al.

(10) Patent No.: US 8,588,542 B1
(45) Date of Patent: Nov. 19, 2013

(54) CONFIGURABLE AND COMPACT PIXEL PROCESSING APPARATUS

(75) Inventors: Sohei Takemoto, Fremont, CA (US); Shang-Hung Lin, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 669 days.

(21) Appl. No.: 11/300,794

(22) Filed: Dec. 13, 2005

(51) Int. Cl.
G06K 9/40 (2006.01)
G06K 9/00 (2006.01)
H04N 11/20 (2006.01)
H04N 7/01 (2006.01)
H04N 5/00 (2011.01)

(52) U.S. Cl.
USPC ........... 382/260; 382/254; 382/162; 348/453; 348/606

(58) Field of Classification Search
USPC .......... 382/162, 254; 348/453, 606–624, 597, 348/251, 254
See application file for complete search history.

(56) References Cited

U.S. PATENT DOCUMENTS

| | | |
|---|---|---|
| 3,904,818 A | 9/1975 | Kovac |
| 4,253,120 A | 2/1981 | Levine |
| 4,646,251 A | 2/1987 | Hayes et al. |
| 4,685,071 A | 8/1987 | Lee |
| 4,739,495 A | 4/1988 | Levine |
| 4,771,470 A * | 9/1988 | Geiser et al. .................. 382/266 |
| 4,920,428 A | 4/1990 | Lin et al. |
| 4,987,496 A | 1/1991 | Greivenkamp, Jr. |
| 5,175,430 A | 12/1992 | Enke et al. |
| 5,261,029 A | 11/1993 | Abi-Ezzi et al. |
| 5,305,994 A | 4/1994 | Matsui et al. |
| 5,387,983 A | 2/1995 | Sugiura et al. |
| 5,475,430 A | 12/1995 | Hamada et al. |
| 5,513,016 A | 4/1996 | Inoue |
| 5,608,824 A | 3/1997 | Shimizu et al. |
| 5,652,621 A | 7/1997 | Adams, Jr. et al. |
| 5,793,433 A * | 8/1998 | Kim et al. ..................... 348/445 |
| 5,878,174 A | 3/1999 | Stewart et al. |
| 5,903,273 A | 5/1999 | Mochizuki et al. |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS

Parhami, Computer Arithmetic, Oxford University Press, Jun. 2000, pp. 413-418.

(Continued)

Primary Examiner — Randolph I Chu

(57) ABSTRACT

An image processing apparatus for processing pixels is disclosed. The image processing apparatus comprises one or more functional blocks adapted to perform a corresponding functional task on the pixels. Further, the image processing apparatus includes one or more line-delay elements for delaying a horizontal scan line of the pixels. A desired processing task, which includes at least one functional task, is performed by configuring each functional block based on an actual number of the line-delay elements used for performing the desired processing task. Each functional block used for performing the desired processing task receives a group of pixels for processing from one or more horizontal scan lines such that the group overlaps another group of pixels for processing from one or more horizontal scan lines by another functional block.

12 Claims, 7 Drawing Sheets

(56) References Cited

U.S. PATENT DOCUMENTS

| | | | |
|---|---|---|---|
| 5,905,530 A | 5/1999 | Yokota et al. | |
| 5,995,109 A | 11/1999 | Goel et al. | |
| 6,016,474 A | 1/2000 | Kim et al. | |
| 6,078,331 A | 6/2000 | Pulli et al. | |
| 6,111,988 A | 8/2000 | Horowitz et al. | |
| 6,118,547 A | 9/2000 | Tanioka | |
| 6,141,740 A | 10/2000 | Mahalingaiah et al. | |
| 6,151,457 A | 11/2000 | Kawamoto | |
| 6,175,430 B1 | 1/2001 | Ito | |
| 6,252,611 B1* | 6/2001 | Kondo | 345/536 |
| 6,256,038 B1 | 7/2001 | Krishnamurthy | |
| 6,281,931 B1 | 8/2001 | Tsao et al. | |
| 6,289,103 B1 | 9/2001 | Sako et al. | |
| 6,314,493 B1 | 11/2001 | Luick | |
| 6,319,682 B1 | 11/2001 | Hochman | |
| 6,323,934 B1 | 11/2001 | Enomoto | |
| 6,392,216 B1 | 5/2002 | Peng-Tan | |
| 6,396,397 B1 | 5/2002 | Bos et al. | |
| 6,438,664 B1 | 8/2002 | McGrath et al. | |
| 6,486,971 B1 | 11/2002 | Kawamoto | |
| 6,504,952 B1 | 1/2003 | Takemura et al. | |
| 6,584,202 B1 | 6/2003 | Montag et al. | |
| 6,594,388 B1 | 7/2003 | Gindele et al. | |
| 6,683,643 B1 | 1/2004 | Takayama et al. | |
| 6,707,452 B1 | 3/2004 | Veach | |
| 6,724,423 B1 | 4/2004 | Sudo | |
| 6,724,932 B1 | 4/2004 | Ito | |
| 6,737,625 B2 | 5/2004 | Baharav et al. | |
| 6,760,080 B1 | 7/2004 | Moddel et al. | |
| 6,785,814 B1 | 8/2004 | Usami et al. | |
| 6,806,452 B2 | 10/2004 | Bos et al. | |
| 6,839,062 B2 | 1/2005 | Aronson et al. | |
| 6,856,441 B2 | 2/2005 | Zhang et al. | |
| 6,891,543 B2 | 5/2005 | Wyatt | |
| 6,900,836 B2 | 5/2005 | Hamilton, Jr. | |
| 6,950,099 B2 | 9/2005 | Stollnitz et al. | |
| 7,009,639 B1 | 3/2006 | Une et al. | |
| 7,015,909 B1 | 3/2006 | Morgan, III et al. | |
| 7,023,479 B2 | 4/2006 | Hiramatsu et al. | |
| 7,088,388 B2 | 8/2006 | MacLean et al. | |
| 7,092,018 B1 | 8/2006 | Watanabe | |
| 7,106,368 B2 | 9/2006 | Daiku et al. | |
| 7,133,041 B2 | 11/2006 | Kaufman et al. | |
| 7,133,072 B2 | 11/2006 | Harada | |
| 7,146,041 B2 | 12/2006 | Takahashi | |
| 7,221,779 B2 | 5/2007 | Kawakami et al. | |
| 7,227,586 B2 | 6/2007 | Finlayson et al. | |
| 7,245,319 B1 | 7/2007 | Enomoto | |
| 7,305,148 B2 | 12/2007 | Spampinato et al. | |
| 7,343,040 B2 | 3/2008 | Chanas et al. | |
| 7,486,844 B2 | 2/2009 | Chang et al. | |
| 7,502,505 B2 | 3/2009 | Malvar et al. | |
| 7,580,070 B2 | 8/2009 | Yanof et al. | |
| 7,626,612 B2 | 12/2009 | John et al. | |
| 7,627,193 B2 | 12/2009 | Alon et al. | |
| 7,671,910 B2 | 3/2010 | Lee | |
| 7,728,880 B2 | 6/2010 | Hung et al. | |
| 7,750,956 B2 | 7/2010 | Wloka | |
| 7,817,187 B2 | 10/2010 | Silsby et al. | |
| 7,859,568 B2 | 12/2010 | Shimano et al. | |
| 7,860,382 B2 | 12/2010 | Grip | |
| 7,912,279 B2 | 3/2011 | Hsu et al. | |
| 8,049,789 B2 | 11/2011 | Innocent | |
| 2001/0001234 A1 | 5/2001 | Addy et al. | |
| 2001/0012113 A1 | 8/2001 | Yoshizawa et al. | |
| 2001/0012127 A1 | 8/2001 | Fukuda et al. | |
| 2001/0015821 A1 | 8/2001 | Namizuka et al. | |
| 2001/0019429 A1 | 9/2001 | Oteki et al. | |
| 2001/0021278 A1 | 9/2001 | Fukuda et al. | |
| 2001/0033410 A1 | 10/2001 | Helsel et al. | |
| 2001/0050778 A1 | 12/2001 | Fukuda et al. | |
| 2001/0054126 A1 | 12/2001 | Fukuda et al. | |
| 2002/0012131 A1 | 1/2002 | Oteki et al. | |
| 2002/0015111 A1 | 2/2002 | Harada | |
| 2002/0018244 A1 | 2/2002 | Namizuka et al. | |
| 2002/0027670 A1 | 3/2002 | Takahashi et al. | |
| 2002/0033887 A1* | 3/2002 | Hieda et al. | 348/220 |
| 2002/0041383 A1 | 4/2002 | Lewis, Jr. et al. | |
| 2002/0044778 A1 | 4/2002 | Suzuki | |
| 2002/0054374 A1 | 5/2002 | Inoue et al. | |
| 2002/0063802 A1 | 5/2002 | Gullichsen et al. | |
| 2002/0105579 A1 | 8/2002 | Levine et al. | |
| 2002/0126210 A1 | 9/2002 | Shinohara et al. | |
| 2002/0146136 A1 | 10/2002 | Carter, Jr. | |
| 2002/0149683 A1 | 10/2002 | Post | |
| 2002/0158971 A1 | 10/2002 | Daiku et al. | |
| 2002/0167202 A1 | 11/2002 | Pfalzgraf | |
| 2002/0191694 A1 | 12/2002 | Ohyama et al. | |
| 2002/0196470 A1 | 12/2002 | Kawamoto et al. | |
| 2003/0035100 A1 | 2/2003 | Dimsdale et al. | |
| 2003/0067461 A1 | 4/2003 | Fletcher et al. | |
| 2003/0122825 A1* | 7/2003 | Kawamoto | 345/428 |
| 2003/0142222 A1 | 7/2003 | Hordley | |
| 2003/0146975 A1 | 8/2003 | Joung et al. | |
| 2003/0169353 A1 | 9/2003 | Keshet et al. | |
| 2003/0169918 A1 | 9/2003 | Sogawa | |
| 2003/0197701 A1 | 10/2003 | Teodosiadis et al. | |
| 2003/0218672 A1 | 11/2003 | Zhang et al. | |
| 2003/0222995 A1 | 12/2003 | Kaplinsky et al. | |
| 2003/0223007 A1 | 12/2003 | Takane | |
| 2004/0001061 A1 | 1/2004 | Stollnitz et al. | |
| 2004/0001234 A1 | 1/2004 | Curry et al. | |
| 2004/0032516 A1 | 2/2004 | Kakarala | |
| 2004/0066970 A1 | 4/2004 | Matsugu | |
| 2004/0100588 A1 | 5/2004 | Hartson et al. | |
| 2004/0101313 A1 | 5/2004 | Akiyama | |
| 2004/0109069 A1 | 6/2004 | Kaplinsky et al. | |
| 2004/0189875 A1 | 9/2004 | Zhai et al. | |
| 2004/0218071 A1 | 11/2004 | Chauville et al. | |
| 2004/0247196 A1 | 12/2004 | Chanas et al. | |
| 2005/0007378 A1 | 1/2005 | Grove | |
| 2005/0007477 A1 | 1/2005 | Ahiska | |
| 2005/0030395 A1 | 2/2005 | Hattori | |
| 2005/0046704 A1 | 3/2005 | Kinoshita | |
| 2005/0099418 A1 | 5/2005 | Cabral et al. | |
| 2005/0175257 A1 | 8/2005 | Kuroki | |
| 2005/0185058 A1 | 8/2005 | Sablak | |
| 2005/0238225 A1 | 10/2005 | Jo et al. | |
| 2005/0243181 A1 | 11/2005 | Castello et al. | |
| 2005/0248671 A1 | 11/2005 | Schweng | |
| 2005/0261849 A1 | 11/2005 | Kochi et al. | |
| 2005/0286097 A1 | 12/2005 | Hung et al. | |
| 2006/0050158 A1 | 3/2006 | Irie | |
| 2006/0061658 A1 | 3/2006 | Faulkner et al. | |
| 2006/0087509 A1 | 4/2006 | Ebert et al. | |
| 2006/0119710 A1 | 6/2006 | Ben-Ezra et al. | |
| 2006/0133697 A1 | 6/2006 | Uvarov et al. | |
| 2006/0176375 A1 | 8/2006 | Hwang et al. | |
| 2006/0197664 A1 | 9/2006 | Zhang et al. | |
| 2006/0274171 A1* | 12/2006 | Wang | 348/294 |
| 2006/0290794 A1 | 12/2006 | Bergman et al. | |
| 2006/0293089 A1 | 12/2006 | Herberger et al. | |
| 2007/0091188 A1 | 4/2007 | Chen et al. | |
| 2007/0147706 A1 | 6/2007 | Sasaki et al. | |
| 2007/0171288 A1 | 7/2007 | Inoue et al. | |
| 2007/0236770 A1 | 10/2007 | Doherty et al. | |
| 2007/0247532 A1 | 10/2007 | Sasaki | |
| 2007/0285530 A1 | 12/2007 | Kim et al. | |
| 2008/0030587 A1 | 2/2008 | Helbing | |
| 2008/0062164 A1 | 3/2008 | Bassi et al. | |
| 2008/0101690 A1 | 5/2008 | Hsu et al. | |
| 2008/0143844 A1 | 6/2008 | Innocent | |
| 2008/0231726 A1 | 9/2008 | John | |
| 2009/0002517 A1 | 1/2009 | Yokomitsu et al. | |
| 2009/0010539 A1 | 1/2009 | Guarnera et al. | |
| 2009/0116750 A1 | 5/2009 | Lee et al. | |
| 2009/0160957 A1 | 6/2009 | Deng et al. | |
| 2009/0257677 A1 | 10/2009 | Cabral et al. | |
| 2010/0266201 A1 | 10/2010 | Cabral et al. | |

FOREIGN PATENT DOCUMENTS

| | | |
|---|---|---|
| EP | 1449169 | 5/2003 |
| EP | 1378790 | 7/2004 |

(56) References Cited

FOREIGN PATENT DOCUMENTS

| | | |
|---|---|---|
| EP | 1447977 | 8/2004 |
| EP | 1550980 | 7/2005 |
| GB | 2045026 | 10/1980 |
| GB | 2363018 | 5/2001 |
| JP | 61187467 | 8/1986 |
| JP | 62151978 | 7/1987 |
| JP | 07015631 | 1/1995 |
| JP | 8036640 | 2/1996 |
| JP | 08079622 | 3/1996 |
| JP | 2001052194 | 2/2001 |
| JP | 2002207242 | 7/2002 |
| JP | 2003085542 | 3/2003 |
| JP | 2004221838 | 8/2004 |
| JP | 2005094048 | 4/2005 |
| JP | 2005182785 | 7/2005 |
| JP | 2005520442 | 7/2005 |
| JP | 2006025005 | 1/2006 |
| JP | 2006086822 | 3/2006 |
| JP | 2006094494 | 4/2006 |
| JP | 2006121612 | 5/2006 |
| JP | 2006134157 | 5/2006 |
| JP | 2007019959 | 1/2007 |
| JP | 2007148500 | 6/2007 |
| JP | 2007233833 | 9/2007 |
| JP | 2007282158 | 10/2007 |
| JP | 2008085388 | 4/2008 |
| JP | 2008277926 | 11/2008 |
| JP | 2009021962 | 1/2009 |
| KR | 1020040043156 | 5/2004 |
| KR | 1020060068497 | 6/2006 |
| KR | 1020070004202 | 1/2007 |
| WO | 03043308 | 5/2003 |
| WO | 2004063989 | 7/2004 |
| WO | 2007056459 | 5/2007 |
| WO | 2007093864 | 8/2007 |

OTHER PUBLICATIONS

Duca et al., "A Relational Debugging Engine for Graphics Pipeline, International Conference on Computer Graphics and Interactive Techniques", ACM SIGGRAPH Jul. 2005, pp. 453-463.

gDEBugger, graphicRemedy, http://www.gremedy.com, Aug. 8, 2006, pp. 1-18.

"A Pipelined Architecture for Real-Time orrection of Barrel Distortion in Wide-Angle Camera Images", Hau, T. Ngo, Student Member, IEEE and Vijayan K. Asari, Senior Member IEEE, IEEE Transaction on Circuits and Sytstems for Video Technology: vol. 15 No. 3 Mar. 2005 pp. 436-444.

"Calibration and removal of lateral chromatic abberation in images" Mallon, et al. Science Direct Copyright 2006; 11 pages.

"Method of Color Interpolation in a Singe Sensor Color Camera Using Green Channel Seperation" Weerasighe, et al Visual Information Processing Lab, Motorola Austrailian Research Center pp. IV-3233-IV3236, 2002.

D. Doo, M. Sabin "Behaviour of recrusive division surfaces near extraordinary points"; Sep. 197; Computer Aided Design; vol. 10, pp. 356-360.

D.W.H. Doo; "A subdivision algorithm for smoothing down irregular shaped polyhedrons"; 1978; Interactive Techniques in Computer Aided Design; pp. 157-165.

Davis, J., Marschner, S., Garr, M., Levoy, M., Filling holes in complex surfaces using volumetric diffusion, Dec. 2001, Stanford University, pp. 1-9.

Donald D. Spencer, "Illustrated Computer Graphics Dictionary", 1993, Camelot Publishing Company, p. 272.

J. Bolz, P. Schroder; "rapid evaluation of catmull-clark subdivision surfaces"; Web 3D '02.

E. Catmull, J. Clark, "recursively enerated B-Spline surfaces on arbitrary topological meshes"; Nov. 1978; Computer aided design; vol. 10; pp. 350-355.

J. Stam; "Exact Evaluation of Catmull-clark subdivision surfaces at arbitrary parameter values"; Jul. 1998; Computer Graphics; vol. 32; pp. 395-404.

http://en.wikipedia.org/wiki/Bayer_filter; "Bayer Filter"; Wikipedia, the free encyclopedia; pp. 1-4.

http://en.wikipedia.org/wiki/Color_filter_array; "Color Filter Array"; Wikipedia, the free encyclopedia; pp. 1-5.

http://en.wikipedia.org/wiki/Color_space; "Color Space"; Wikipedia, the free encyclopedia; pp. 1-4.

http://en.wikipedia.org/wiki/Color_translation; "Color Management"; Wikipedia, the free encyclopedia; pp. 1-4.

http://en.wikipedia.org/wiki/Demosaicing; "Demosaicing"; Wikipedia, the free encyclopedia; pp. 1-5.

http://en.wikipedia.org/wiki/Half_tone; "Halftone"; Wikipedia, the free encyclopedia; pp. 1-5.

http://en.wikipedia.org/wiki/L*a*b*; "Lab Color Space"; Wikipedia, the free encyclopedia; pp. 1-4.

http://Slashdot.org/articles/07/09/06/1431217.html.

http:englishrussia.com/?p=1377.

Keith R. Slavin; Application As Filed entitled "Efficient Method for Reducing Noise and Blur in a Composite Still Image From a Rolling Shutter Camera"; Application No. 12069669; Filed Feb. 11, 2008.

Ko et al., "Fast Digital Image Stabilizer Based on Gray-Coded Bit-Plane Matching", IEEE Transactions on Consumer Electronics, vol. 45, No. 3, pp. 598-603, Aug. 1999.

Ko, et al., "Digital Image Stabilizing Algorithms Basd on Bit-Plane Matching", IEEE Transactions on Consumer Electronics, vol. 44, No. 3, pp. 617-622, Aug. 1988.

Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.

Kumar, S., Manocha, D., Interactive display of large scale trimmed NURBS models, 1994, University of North Carolina at Chapel Hill, Technical Report, p. 1-36.

Kuno et al. "New Interpolation Method Using Discriminated Color Correlation for Digital Still Cameras" IEEE Transac. On Consumer Electronics, vol. 45, No. 1, Feb. 1999, pp. 259-267.

Loop, C., DeRose, T., Generalized B-Spline surfaces o arbitrary topology, Aug. 1990, SIGRAPH 90, pp. 347-356.

M. Halstead, M. Kass, T. DeRose; "efficient, fair interolation using catmull-clark surfaces"; Sep. 1993; Computer Graphics and Interactive Techniques, Proc; pp. 35-44.

Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.

Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.

S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.

S. Erturk, "Real-Time Digital Image Stabilization Using Kalman Filters", http://www.ideallibrary.com, Real-Time Imaging 8, pp. 317-328, 2002.

T. DeRose, M., Kass, T. Troung; "subdivision surfaces in character animation"; Jul. 1998; Computer Graphics and Interactive Techniques, Proc; pp. 85-94.

Takeuchi, S., Kanai, T., Suzuki, H., Shimada, K., Kimura, F., Subdivision surface fitting with QEM-basd mesh simplificatio and reconstruction of aproximated B-Spline surfaces, 200, Eighth Pacific Conference on computer graphics and applications pp. 202-2012.

Uomori et al., "Automatic Image Stabilizing System by Full-Digital Signal Processing", vol. 36, No. 3, pp. 510-519, Aug. 1990.

Uomori et al., "Electronic Image Stabiliztion System for Video Cameras and VCRS", J. Soc. Motion Pict. Telev. Eng., vol. 101, pp. 66-75, 1992.

* cited by examiner

CONFIGURABLE AND COMPACT PIXEL PROCESSING APPARATUS

BACKGROUND OF THE INVENTION

1. Field of the Invention

Embodiments of the present invention generally relate to pixel processing. More particularly, embodiments of the present invention relate to configurable and compact pixel processing apparatus.

2. Related Art

The market for electronic products is divided into several sectors. Each market sector demands a specific range of performance within specific cost levels. As the market for electronic products evolves, it further divides into additional sectors. This gives rise to several issues. Since it is generally impractical to pursue all the market sectors, specific market sectors are selected. Once the specific market sectors are selected, electronic products are developed that meet the cost and performance demands of the selected market sectors.

In general, the electronic products are tailored for specific market sectors by its components. Low cost and low performance components are incorporated into electronic products for low cost and low performance market sectors. High cost and high performance components are incorporated into electronic products for high cost and high performance market sectors. Moreover, various versions of the same component may be manufactured for different market sectors.

SUMMARY OF THE INVENTION

An image processing apparatus for processing pixels is disclosed. The image processing apparatus comprises one or more functional blocks adapted to perform a corresponding functional task on the pixels. Further, the image processing apparatus includes one or more line-delay elements for delaying a horizontal scan line of the pixels. A desired processing task, which includes at least one functional task, is performed by configuring each functional block based on an actual number of the line-delay elements used for performing the desired processing task. Each functional block used for performing the desired processing task receives a group of pixels for processing from one or more horizontal scan lines such that the group overlaps another group of pixels for processing from one or more horizontal scan lines by another functional block.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Figure 1:
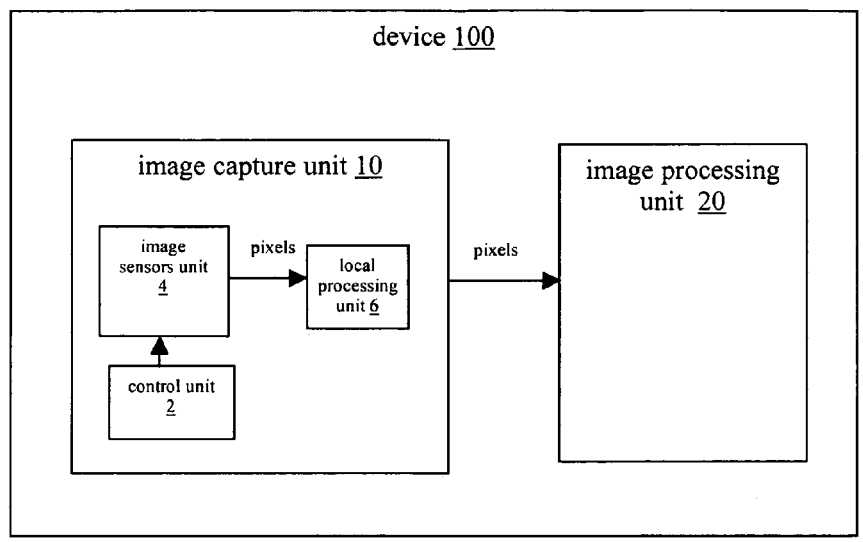
FIG. 1 illustrates a device in accordance with an embodiment of the present invention.

FIG. 1 illustrates a device 100 in accordance with an embodiment of the present invention. The device 100 includes an image capture unit 10 for generating an image comprising a plurality of horizontal scan lines of pixels and an image processing unit 20 for processing the pixels. The image capture unit 10 has a control unit 2, an image sensors unit 4, and a local processing unit 6. The image sensors unit 4 includes a plurality of image sensors. Examples of image sensors include CCD sensors and CMOS sensors. Under the control of the control unit 2, the image sensors unit 4 captures and outputs an image comprising a plurality of horizontal scan lines of pixels. The local processing unit 6 processes the pixels.

The device 100 may be a digital camera, a camera phone, a camera PDA (personal digital assistant), or any other type of device with imaging capability. Additionally, the device 100 may be a portable or handheld device.

As depicted in FIG. 1, the image processing unit 20 receives the pixels from the image capture unit 10. The image processing unit 20 processes the plurality of horizontal scan lines of pixels of the image. In particular, the image processing unit 20 is capable of performing various functional tasks on the pixels. Examples of functional tasks include defective pixel concealment, noise filtering, color interpolation, and edge enhancement. For real-time processing, the image processing unit 20 is able to utilize line-delay elements for delaying a horizontal scan line of pixels and pixel-delay elements. Since the cost of a line-delay element is much greater than the cost of a pixel-delay element and since performance is directly related to the number of line-delay elements utilized, the image processing unit 20 is configurable to meet various price and performance requirements. For example, the image processing unit 20 may have X number of line-delay elements. The image processing unit 20 may be configured to use X number of line-delay elements to provide high performance with a high price tag. Also, the image processing unit 20 may be configured to use any subset of the X number of line-delay elements to provide lower performance with a lower price tag.

Further, the image processing unit 20 provides a compact implementation by overlapping the various groups of pixels on which separate functional tasks are performed. This allows line-delay element to be shared by separate functional tasks.

Figure 2A:
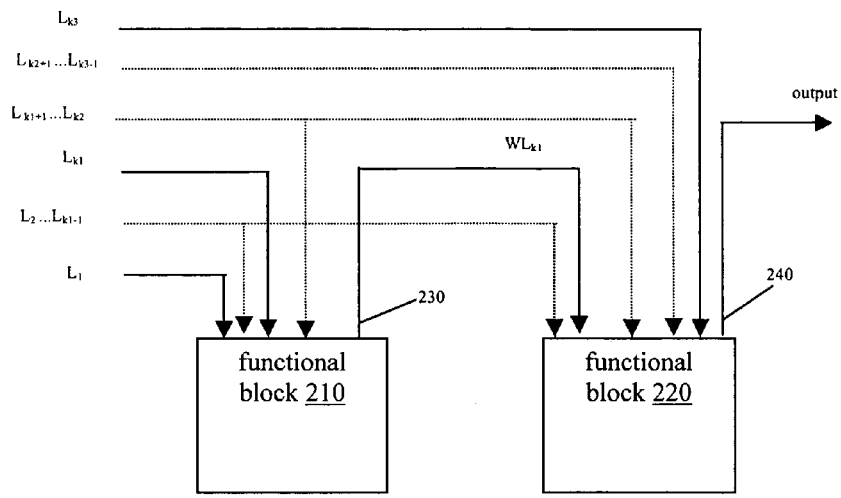
FIG. 2A illustrates a processing arrangement of functional blocks in accordance with an embodiment of the present invention.

FIG. 2A illustrates a processing arrangement 200 of functional blocks in accordance with an embodiment of the present invention. This processing arrangement 200 is implemented in the image processing unit 20. As shown in FIG. 2A, the processing arrangement 200 includes one or more functional blocks 210 and 220, wherein each functional block 210 and 220 is adapted to perform a corresponding functional task on the pixels. Examples of functional tasks include defective pixel concealment, noise filtering, color interpolation, and edge enhancement. Moreover, each functional block 210 and 220 comprises a configurable input and a configurable output.

Focusing on FIG. 2A, each symbol L represents a different horizontal scan line of pixels. The subscript (e.g., 1, k1, k2, k3, etc.) is used to enumerate the symbol L. Moreover, horizontal scan line $L_1$ to horizontal scan line $L_{k3}$ represent k3 consecutive horizontal scan lines. Generally, the image processed by the image processing unit 20 (FIG. 1) has more horizontal scan lines than the value k3. However, the image processing unit 20 concurrently processes k3 horizontal scan lines of the image.

In this processing arrangement 200, pixels from k3 consecutive horizontal scan lines are concurrently processed by functional blocks 210 and 220. In general, pixel processing is performed on a group of pixels, wherein the group includes the target pixel and pixels surrounding the target pixel. As input, the functional block 210 receives pixels from k2 consecutive horizontal scan lines, wherein the target pixel is in the input horizontal scan line $L_{k1}$. Moreover, the functional block 210 provides its processing result at the output 230 so that an updated pixel value Wk1 (FIG. 3) may be written to the corresponding input horizontal scan line $L_{k1}$ to form input horizontal scan line $WL_{k1}$ for use by the functional block 220.

In one embodiment, as input, the functional block 220 receives pixels from consecutive horizontal scan lines already processed by functional block 210. Thus, pixels from input horizontal scan line $WL_{k1}$ to input horizontal scan line $L_{k3}$ are received, wherein the target pixel is in the input horizontal scan line $L_{k2}$. Moreover, the functional block 220 provides its processing result at the output 240. Additionally, an updated pixel value may be written to another input horizontal scan line for use by another functional block.

In another embodiment, as input, the functional block 220 receives pixels from consecutive horizontal scan lines already processed by functional block 210 and not yet processed by functional block 210. For example, pixels from input horizontal scan line $L_{k0}$ (where k0 is greater than 1 and less than k3) to input horizontal scan line $L_{k3}$ may be received, wherein the target pixel is in the input horizontal scan line $L_{k2}$. Moreover, the functional block 220 provides its processing result at the output 240. Additionally, an updated pixel value may be written to another input horizontal scan line for use by another functional block.

It should be understood that a functional block may be divided into two or more functional blocks. Moreover, there may be more than two functional blocks. Further, a functional block may be bypassed by coupling an input horizontal scan line to a corresponding output of the functional block (e.g., coupling the input horizontal scan line $L_{k1}$ to output 230 of functional block 210 causes bypass of functional block 210). This makes possible multiple configurations for the processing arrangement 200.

Figure 2B:
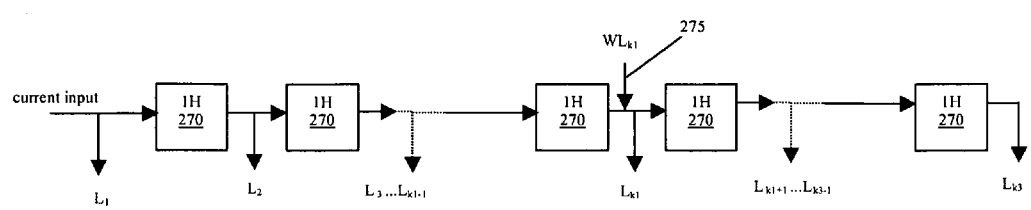
FIG. 2B illustrates a delay arrangement of line-delay elements for the processing arrangement of FIG. 2A in accordance with an embodiment of the present invention.

FIG. 2B illustrates a delay arrangement 280 of line-delay elements 270 for the processing arrangement of FIG. 2A in accordance with an embodiment of the present invention. This delay arrangement 280 is implemented in the image processing unit 20. As depicted in FIG. 2B, delay arrangement 280 includes one or more line-delay elements 270 for delaying a horizontal scan line of the pixels. Since the processing arrangement 200 concurrently processes pixels from k3 (e.g., $L_1$ to $L_{k3}$) consecutive horizontal scan lines, the delay arrangement 280 has k3-1 line-delay elements 270. In an embodiment, each line-delay element 270 comprises a memory location in a RAM (random access memory). The output of functional block 210 is made available to functional block 220 by performing a write operation 275 to the input horizontal scan line $L_{k1}$ to form input horizontal scan line $WL_{k1}$ for use by the functional block 220.

Figure 3:
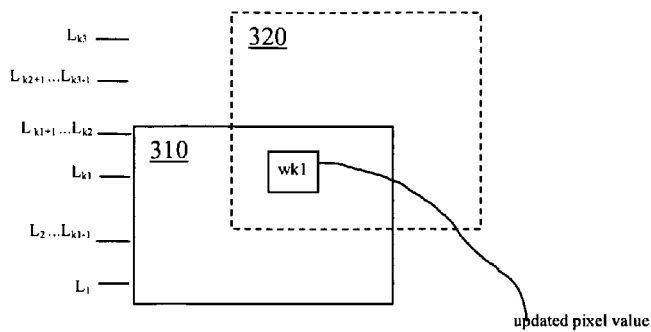
FIG. 3 illustrates pixel processing overlap arrangement in the processing arrangement of FIG. 2A in accordance with an embodiment of the present invention.

FIG. 3 illustrates pixel processing overlap arrangement 300 in the processing arrangement 200 of FIG. 2A in accordance with an embodiment of the present invention. As depicted in FIG. 3, the group 310 of pixels from multiple horizontal scan lines processed by the functional block 210 overlaps the group 320 of pixels from multiple horizontal scan lines processed by the functional block 220. Moreover, the updated pixel value Wk1 is provided in the group 320 of pixels by performing a write operation as described above. This pixel processing overlap arrangement 300 leads to a compact implementation for the image processing unit 20 of FIG. 1. Moreover, the pixel processing overlap arrangement 300 facilitates efficient use of line-delay elements through sharing among the functional blocks 210 and 220 of FIG. 2A. Further, a subset of the line-delay elements may be utilized instead of all the line-delay elements 270. Thus, a desired processing task, which includes at least one functional task, is performed on pixels by configuring each functional block based on an actual number of line-delay elements used for performing the desired processing task.

Figure 4A:
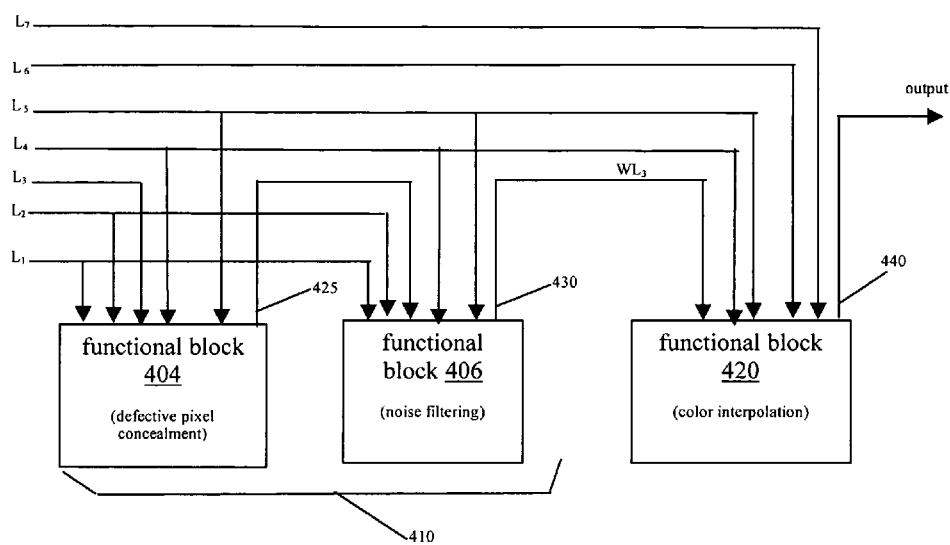
FIG. 4A illustrates an exemplary processing arrangement of functional blocks in accordance with an embodiment of the present invention.

FIG. 4A illustrates an exemplary processing arrangement 400 of functional blocks in accordance with an embodiment of the present invention. This exemplary processing arrangement 400 is implemented in the image processing unit 20 of FIG. 1. As shown in FIG. 4A, the exemplary processing arrangement 400 includes functional blocks 410 and 420, wherein functional block 410 is further divided into functional blocks 404 and 406. The functional block 404 performs defective pixel concealment while the functional block 406 performs noise filtering. Moreover, functional block 420 performs color interpolation. It should be understood that functional blocks 404, 406, and 420 may perform other functions.

In this exemplary processing arrangement 400, pixels from seven consecutive horizontal scan lines are concurrently processed by functional blocks 404, 406, and 420. In general, pixel processing is performed on a group of pixels, wherein the group includes the target pixel and pixels surrounding the target pixel. As input, the functional block 404 receives pixels from consecutive horizontal scan lines $L_1$ to $L_5$, wherein the target pixel is in the input horizontal scan line $L_3$. Moreover, the functional block 404 provides its processing result at the output 425 so that an updated pixel value A (FIG. 5) may be used by the functional block 406. As input, the functional block 406 receives pixels from consecutive horizontal scan lines $L_1$ to $L_2$ and $L_4$ to $L_5$ and output 425 of functional block 404, wherein the target pixel is in the input horizontal scan line $L_3$ which corresponds to the output 425 of functional block 404. Moreover, the functional block 406 provides its processing result at the output 430 so that an updated pixel value B (FIG. 5) may be written to the corresponding input horizontal scan line $L_3$ to form input horizontal scan line $WL_3$ for use by the functional block 420.

As input, the functional block 420 receives pixels from consecutive horizontal scan lines $WL_3$ to $L_7$, wherein the target pixel is in the input horizontal scan line $L_5$. Moreover, the functional block 420 provides its processing result at the output 440.

Figure 4B:
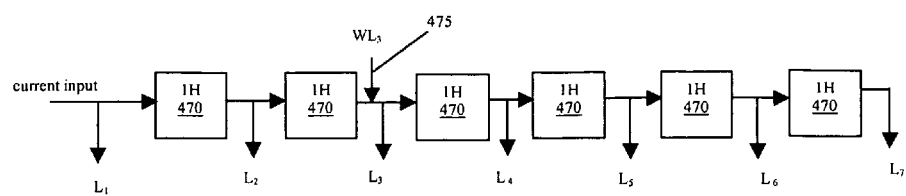
FIG. 4B illustrates an exemplary delay arrangement of line-delay elements for the exemplary processing arrangement of FIG. 4A in accordance with an embodiment of the present invention.

FIG. 4B illustrates an exemplary delay arrangement of line-delay elements for the exemplary processing arrangement of FIG. 4A in accordance with an embodiment of the present invention. This exemplary delay arrangement 480 is implemented in the image processing unit 20 of FIG. 1. As depicted in FIG. 4B, delay arrangement 480 includes six line-delay elements 470 for delaying a horizontal scan line of the pixels since the exemplary processing arrangement 400 concurrently processes pixels from seven (e.g., $L_1$ to $L_7$) consecutive horizontal scan lines. In an embodiment, each line-delay element 470 comprises a memory location in a RAM (random access memory). The output of functional block 406 is made available to functional block 420 by performing a write operation 475 to the input horizontal scan line $L_3$ to form input horizontal scan line $WL_3$ for use by the functional block 420.

Figure 5:
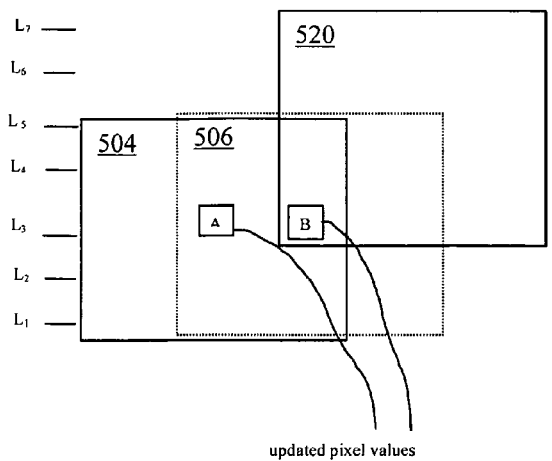
FIG. 5 illustrates exemplary pixel processing overlap arrangement in the processing arrangement of FIG. 4A in accordance with an embodiment of the present invention.

FIG. 5 illustrates exemplary pixel processing overlap arrangement in the processing arrangement of FIG. 4A in accordance with an embodiment of the present invention. As depicted in FIG. 5, the group 504 of pixels from multiple horizontal scan lines processed by the functional block 404 overlaps the group 506 of pixels from multiple horizontal scan lines processed by the functional block 406. Moreover, the updated pixel value A is provided in the group 506 of pixels. Further, the group 506 of pixels from multiple horizontal scan lines processed by the functional block 406 overlaps the group 520 of pixels from multiple horizontal scan lines processed by the functional block 420. Moreover, the updated pixel value B is provided in the group 520 of pixels by performing a write operation as described above. This exemplary pixel processing overlap arrangement 500 leads to a compact implementation for the image processing unit 20 of FIG. 1. Moreover, the exemplary pixel processing overlap arrangement 500 facilitates efficient use of line-delay elements through sharing among the functional blocks 404, 406, and 420. Further, a subset of the line-delay elements may be utilized instead of all the line-delay elements 470. Thus, a desired processing task, which includes at least one functional task, is performed on pixels by configuring each functional block based on an actual number of line-delay elements used for performing the desired processing task. That is, an actual number of the line-delay elements are selected. Then, each functional block is configured based on the actual number of the line-delay elements so that to perform the desired processing task.

In an alternate configuration, the exemplary processing arrangement 400 may be changed so that the functional block 420 operates on three consecutive horizontal scan lines instead of five consecutive scan lines, eliminating the need for two of the line-delay elements and $L_6$ and $L_7$.

In yet another configuration, the exemplary processing arrangement 400 may be changed so that functional blocks 404 and 406 are bypassed (e.g., coupling the input horizontal scan line $L_3$ to output 425 of functional block 404 causes bypass of functional block 404, coupling the output 425 of functional block 404 to output 430 of functional block 404 causes bypass of functional block 406) and so that there is no need to perform a write operation by coupling inputs $L_1$ through $L_5$ to inputs $L_3$ through $L_7$ respectively, eliminating the need for two of the line-delay elements.

In still another configuration, the exemplary processing arrangement 400 may be changed so that functional blocks 404 and 406 are bypassed (e.g., coupling the input horizontal scan line $L_3$ to output 425 of functional block 404 causes bypass of functional block 404, coupling the output 425 of functional block 404 to output 430 of functional block 404 causes bypass of functional block 406), so that there is no need to perform a write operation, and so that the functional block 420 operates on three consecutive horizontal scan lines instead of five consecutive scan lines by coupling inputs $L_1$ through $L_3$ to inputs $L_4$ through $L_6$ respectively, eliminating the need for four of the line-delay elements.

As a result, either performance or price tag may be emphasized depending on a given application.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An image processing apparatus for processing pixels, comprising:
   a plurality of functional blocks adapted to perform a corresponding functional task on said pixels arranged into horizontal scan lines, wherein said functional blocks operate concurrently on said pixels, wherein a first functional block of said functional blocks operates on a first set of consecutive horizontal scan lines while a second functional block of said functional blocks operates concurrently on a second set of consecutive horizontal scan lines, wherein said first set includes an overlapping portion of consecutive horizontal scan lines with respect to said second set and a non-overlapping portion of consecutive horizontal scan lines with respect to said second set, wherein said second functional block is configured to receive an output of said first functional block; and
   a plurality of line-delay elements for delaying a respective horizontal scan line of said pixels.

2. The image processing apparatus as recited in claim 1 wherein said functional task is one of defective pixel concealment, noise filtering, color interpolation, and edge enhancement.

3. The image processing apparatus as recited in claim 1 wherein each functional block further comprises a configurable output.

4. The image processing apparatus as recited in claim 1 wherein a write operation makes available an output of a functional block to another functional block.

5. The image processing apparatus as recited in claim 1 wherein a functional block is bypassed by coupling said configurable input that receives said target pixel to an output of said functional block.

6. The image processing apparatus as recited in claim 1 wherein said horizontal scan lines are consecutive horizontal scan lines, wherein said functional blocks are configured to perform said corresponding functional tasks by using a first subset of said line-delay elements instead of said plurality of line-delay elements, wherein said functional blocks are configured to perform said corresponding functional tasks by using a second subset of said line-delay elements instead of said plurality of line-delay elements, wherein each line-delay element comprises a memory location in a RAM (random acess memory), wherein each functional block comprises a plurality of configurable inputs, wherein for each functional block said configurable inputs are selectively coupled to a subset of said line-delay elements to receive said respective horizontal scan lines of said pixels, wherein for each functional block at least one of said configurable inputs receives said respective horizontal scan line including a target pixel, wherein for each functional block at least one of said configurable inputs receives said respective horizontal scan line including a pixel adjacent to said target pixel, and wherein each subset of said line-delay elements associated with said functional blocks overlaps another subset of said line-delay elements.

7. A method of processing pixels, said method comprising:
providing a plurality of functional blocks, which operate concurrently on said pixels, in an image processing apparatus, each functional block adapted to perform a corresponding functional task on said pixels arranged into horizontal scan lines, wherein a first functional block of said functional blocks operates on a first set of consecutive horizontal scan lines while a second functional block of said functional blocks operates concurrently on a second set of consecutive horizontal scan lines, wherein said first set includes an overlapping portion of consecutive horizontal scan lines with respect to said second set and a non- overlapping portion of consecutive horizontal scan lines with respect to said second set, wherein said second functional block is configured to receive an output of said first functional block; and
providing a plurality of line-delay elements in said image processing apparatus, each line-delay element for delaying a respective horizontal scan line of pixels.

8. The method as recited in claim 7 wherein said functional task is one of defective pixel concealment, noise filtering, color interpolation, and edge enhancement.

9. The method as recited in claim 7 wherein each functional block further comprises a configurable output, wherein said functional blocks are configured to perform said corresponding functional tasks by using a first subset of said line-delay elements instead of said plurality of line-delay elements, wherein said functional blocks are configured to perform said corresponding functional tasks by using a second subset of said line-delay elements instead of said plurality of line-delay elements.

10. The method as recited in claim 7 further comprising:
performing a write operation to make available an output of a functional block to another functional block.

11. The method as recited in claim 7 further comprising:
bypassing a functional block by coupling said input that receives said target pixel to an output of said functional block.

12. The method as recited in claim 7 wherein said horizontal scan lines are consecutive horizontal scan lines, and further comprising:
for each functional block, configuring at least one input to receive said respective horizontal scan line including a target pixel; and
for each functional block, configuring at least one input to receive said respective horizontal scan line including a pixel adjacent to said target pixel, wherein each subset of said line-delay elements associated with said functional blocks overlaps another subset of said line-delay elements.

* * * * *